April 2, 1946.    W. H. GRAVES    2,397,481
METHOD OF TREATING WATER JACKETS FOR ENGINE CYLINDERS
Filed July 18, 1944
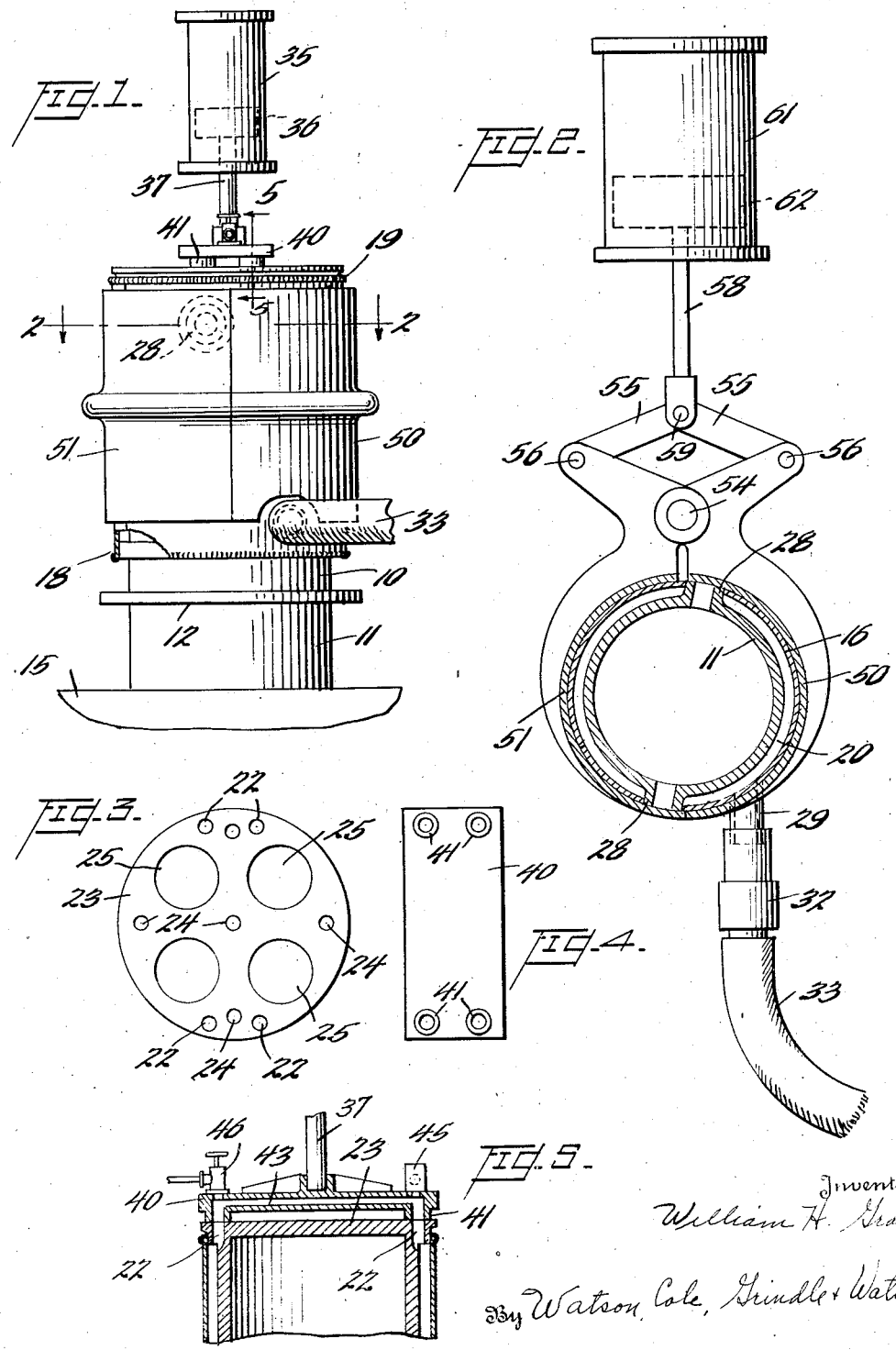
Inventor
William H. Graves
By Watson, Cole, Grindle & Watson
Attorney Patented Apr. 2, 1946

2,397,481

UNITED STATES PATENT OFFICE 2,397,481

METHOD OF TREATING WATER JACKETS FOR ENGINE CYLINDERS

William H. Graves, Huntington Woods, Mich., assignor to Packard Motor Car Company, Detroit, Mich., a corporation of Michigan Application July 18, 1944, Serial No. 545,516

1 Claim. (Cl. 29—156.4)

This invention relates to a method of treating the coolant jackets of internal combustion engines, hereinafter referred to as water jackets, to increase their resistance to cracking during operation of the engine.

For reasons of efficiency and economy it is the practice in the building of certain types of engines, especially marine engines, to form the water jackets of fairly thin sheet metal, which is bent into cylindrical shape, welded lengthwise, and welded at its upper and lower ends to the engine cylinder. While these jackets are subjected in use only to the relative low pressures existing in the water chambers thus formed, they are subjected to repeated and wide variations of temperature and induced stresses which not uncommonly result in fatigue and ultimate cracking of the jackets. It has been found that these defects can be overcome by subjecting the jacket to a preliminary treatment whereby the metal of the jacket is distended. One effect of this treatment is to produce in the jacket compressive rather than tensile stresses, with the result that tensile strains are materially lessened and failure due to cracking is substantially eliminated.

It is therefore an object of the instant invention to provide a method of treating the jackets of internal combustion engines which includes the steps of assembling the jacket to the cylinder and applying to the water chamber thus formed a fluid pressure substantially in excess of the pressure existing in the chamber during use of the engine, whereby the jacket is distended or stretched, and thereafter relieving the pressure.

Preferably the jacket is confined during the application of this excessive pressure so as to limit the expansion thereof; if desired, the expansion of the jacket may be limited in one lateral direction only, or at least to a less extent in such direction, so as to assure adequate clearance for the assembling of adjacent cylinders in an aligned multi-cylinder engine. The excessive pressure may be applied through one of the openings in the jacket provided for the circulation of water when in use, the other openings being closed; a suitable fluid for applying the pressure is water.

Further objects and features of the invention will be apparent from the following description taken in connection with the accompanying drawing in which Figure 1 represents an elevation of one form of apparatus for use in practicing the method of the instant invention;

Figure 2 is a transverse sectional view taken substantially on the line 2—2 of Figure 1;

Figure 3 is a plan view of the upper end of a cylinder;

Figure 4 is a bottom plan of one element of the apparatus showing the means for closing the water outlets of the cylinder illustrated in Figure 3; and Figure 5 is a vertical sectional view taken substantially on the line 5—5 of Figure 1.

In order to facilitate the description of the invention and to promote an understanding of its principles, the invention is illustrated by a specific and preferred embodiment thereof. It will nevertheless be appreciated that various alterations and further modifications of the illustrated structure are contemplated such as fall within the purview of the invention and especially within the scope of the claim appended hereto.

Turning now to the drawing in which is illustrated an apparatus to facilitate performance of the method of the present invention, an engine cylinder indicated at 10, having a depending collar 11 adapted to be received within a crankcase opening and a flange 12 whereby the cylinder may be bolted in position on the crankcase, is seated on a suitable support 15. A water jacket 16, formed of sheet metal bent into general cylindrical shape and welded at its ends as indicated at 18 and 19 to cylinder flanges, surrounds and is spaced from the external wall of the cylinder so as to provide therebetween, as shown at 20 in Figure 2, an annular water chamber. This chamber is in communication at its upper end with water outlet openings 22, four being shown in Figure 3, formed in the plate 23 which closes the upper end of the cylinder. The plate 23 is provided with valve openings 25 affording communication with the interior of the cylinder and with threaded openings 24 for the reception of bolts which secure the valve housing (not shown) in position. The cylinder is provided with spark plug bosses 28, the water jacket surrounding and being welded to these bosses. Secured to the jacket by welding is a water inlet nipple 29 through which water is caused to flow into the water chamber during the operation of the engine, being discharged through the water outlet openings 22 into the cylinder head from whence it is discharged.

The structure thus far described is conventional and the details thereof form no part of the instant invention. It is intended merely to represent a cylinder structure which employs a water jacket of sheet metal which may be treated in accordance with the method hereinafter described.

In the application of this method, fluid under pressure, for example water, may be introduced into the water chamber through the water inlet nipple 29 by means of a coupling 32 on the delivery end of a hose 33, the coupling being suitably designed to engage securely but releasably with the inlet nipple 29.

Mounted above the jacketed cylinder is a device for closing the water outlet openings 22 in the top cylinder plate 23. This device may include an air operated cylinder 35 having therein a piston 36 secured to plunger 37 which carries at its lower end a plate 40 having bosses 41 formed on the lower side thereof in number corresponding to the number of water outlets 22 and correspondingly disposed, so that when the pistons 36 and plunger 37 descend, each of the bosses 41 engages over one of the water outlets 22. The lower faces of these bosses may be provided with gasket material or otherwise treated to insure a tight fit when pressed against the upper surface of the plate 23 of the cylinder.

Each boss 41 is apertured to communicate with the water outlet with which it engages, and these apertures are connected by ducts 43 formed in the plate 40. A bleed valve 46 communicates with the ducts 43 and with the openings in the bosses 41, so that when a fluid such as water is forced into the water jacket through the inlet nipple 29, air may be discharged from the water jacket by opening the valve 43 until the water completely fills the jacket. A check valve 45 may be provided for attachment of a pressure gauge.

It will be appreciated from the foregoing that when the water outlets 22 are closed by the apparatus disposed immediately above the cylinder, and water or other fluid is delivered under pressure to the water chamber through the inlet nipple 29, the water jacket 16 is distended or stretched preferably resulting in a permanent set. A suitable pressure for this purpose is one of the order of 700 or 800 pounds per square inch, but will obviously vary depending upon the character and thickness of the water jacket being treated. In any event, the pressure is many times the pressures normally existing in the water chamber during use of the engine. Following the application of adequate pressure and accompanying distention of the jacket, the pressure is released and the cylinder is ready for mounting in the engine crankcase.

It has been found desirable, as hereinbefore indicated, to limit the expansion of the water jacket. There are several reasons for this, one being the advisability of insuring against serious distortion of the jacket which might result from the use of unnecessarily high pressure, and another the need to restrict expansion of the jacket in that lateral direction which, when the cylinder is assembled in an aligned multi-cylinder engine, lies in the axis defined by the row of cylinders, it being obvious that undue expansion in this direction would make the assembly of the cylinders difficult or impossible to accomplish.

For this purpose, I may employ the apparatus shown in Figures 1 and 2 which comprises essentially a clamping member having arms 50 and 51 embracing the cylinder over a substantial portion of the depth of the latter. These arms are pivoted together as indicated at 54 and are operated by links 55 pivoted to the respective arms at 56 and to a plunger 58 at 59. The plunger 58 is carried by a piston 62 and may be moved toward the engine cylinder by air or other fluid under pressure in the cylinder 61, the links 55 affording a toggle action so that adequate resistance to outward displacement of the arms is afforded once they are moved into engagement with the cylinder jacket.

Preferably the inner surfaces of the arms 50 and 51 define a shape which is slightly oval rather than circular in transverse section. In this way the expansion of the jacket in one lateral direction will be restricted to a dimension less than in the direction at right angles thereto, so as to insure that adjacent cylinders may be mounted in close juxtaposition.

It will be appreciated that the apparatus described herein for carrying out the method is intended only for the purpose of illustration and that it may be varied widely. In fact, the essential features of the invention may be practiced without resort to any apparatus other than some means for applying a high pressure to the water chamber of the engine and, in the event limitation of expansion of the jacket is desired, some simple means for embracing the jacket wall to achieve this result.

Having thus described the invention, what is claimed as new and desired to be secured by Letters Patent is:

In a method of treating water jackets for aligned cylinders of multi-cylinder internal combustion engines to eliminate failure caused by stresses during use, the steps which comprise assembling the water jackets to the cylinders and applying to the water chambers thus provided a fluid pressure substantially in excess of the pressure for which the jackets are designed when in use, so as to expand the jackets to an extent sufficient to effect a permanent set, simultaneously confining the jackets to limit the expansion thereof in a lateral direction corresponding to the longitudinal axis defined by the several cylinders when assembled in the engine, so that the expansion in such direction is substantially less than in a direction normal thereto, and so that the outside diameter, measured in such direction, of each jacket wall when expanded is not greater than the distance between the cylinder axes of adjacent assembled cylinders, and thereafter releasing the excessive fluid pressure.

WILLIAM H. GRAVES